US012210322B2

(12) United States Patent
Altintas

(10) Patent No.: US 12,210,322 B2
(45) Date of Patent: Jan. 28, 2025

(54) TIMEPIECE AND AZIMUTH DETECTION METHOD

(71) Applicant: SONY GROUP CORPORATION, Tokyo (JP)

(72) Inventor: Ersin Altintas, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 513 days.

(21) Appl. No.: 17/593,655

(22) PCT Filed: Mar. 30, 2020

(86) PCT No.: PCT/JP2020/014480
§ 371 (c)(1),
(2) Date: Sep. 22, 2021

(87) PCT Pub. No.: WO2020/203951
PCT Pub. Date: Oct. 8, 2020

(65) Prior Publication Data

US 2022/0179371 A1 Jun. 9, 2022

(30) Foreign Application Priority Data

Apr. 2, 2019 (JP) ................................ 2019-070514

(51) Int. Cl.
*G04G 21/02* (2010.01)
*G04C 9/00* (2006.01)

(52) U.S. Cl.
CPC ............... *G04G 21/02* (2013.01); *G04C 9/00* (2013.01)

(58) Field of Classification Search
CPC ............. G04G 21/02; G04C 9/00; G04C 3/14
See application file for complete search history.

(56) References Cited

U.S. PATENT DOCUMENTS

| | | | | |
|---|---|---|---|---|
| 2,893,257 | A * | 7/1959 | Schulte | F16H 57/12 968/293 |
| 5,130,956 | A * | 7/1992 | Ueda | G04C 3/008 368/81 |
| 9,217,639 | B1 | 12/2015 | Zhang et al. | |
| 9,971,314 | B2 * | 5/2018 | Lee | G04G 21/00 |
| 2017/0115632 | A1 | 4/2017 | Matsuno et al. | |
| 2017/0255165 | A1 * | 9/2017 | Zaugg | G04B 17/227 |

(Continued)

FOREIGN PATENT DOCUMENTS

| | | | |
|---|---|---|---|
| CN | 108279558 | A | 7/2018 |
| JP | 2005-274359 | A | 10/2005 |
| JP | 2006-275803 | A | 10/2006 |

(Continued)

OTHER PUBLICATIONS

Wikipedia article "Azimuth", https://en.wikipedia.org/wiki/Azimuth (Year: 2024).*

(Continued)

*Primary Examiner* — Edwin A. Leon
*Assistant Examiner* — Sean R Brannon
(74) *Attorney, Agent, or Firm* — CHIP LAW GROUP

(57) ABSTRACT

A timepiece includes a pointer; an angular velocity sensor that is provided on the pointer and detects an angular velocity; and an azimuth detection processing unit that performs an azimuth detection process from a detection result of the angular velocity sensor.

13 Claims, 17 Drawing Sheets

(56) References Cited

U.S. PATENT DOCUMENTS

2018/0188696 A1 7/2018 Mimura et al.

FOREIGN PATENT DOCUMENTS

JP 2013-127413 A 6/2013
JP 2017-078675 A 4/2017
JP 2018-109579 A 7/2018

OTHER PUBLICATIONS

International Search Report and Written Opinion of PCT Application No. PCT/JP2020/014480, issued on Jun. 16, 2020, 08 pages of ISRWO.

* cited by examiner

ANGULAR VELOCITY DETECTION

ANGULAR VELOCITY DETECTION

ANGULAR VELOCITY DETECTION

ANGULAR VELOCITY DETECTION

TIMEPIECE AND AZIMUTH DETECTION METHOD

CROSS REFERENCE TO RELATED APPLICATIONS

This application is a U.S. National Phase of International Patent Application No. PCT/JP2020/014480 filed on Mar. 30, 2020, which claims priority benefit of Japanese Patent Application No. JP 2019-070514 filed in the Japan Patent Office on Apr. 2, 2019. Each of the above-referenced applications is hereby incorporated herein by reference in its entirety.

TECHNICAL FIELD

The present technology relates to a timepiece, an azimuth detection method, and a program.

BACKGROUND ART

In recent years, it is common that various devices such as a terminal device such as a smartphone and a wearable device such as a so-called timepiece worn by a user at all times have a function of detecting an azimuth for a map function, a guidance function, an information provision function around a current position, and the like.

Various proposals have been made such that a gyro sensor or the like is used to detect an angular velocity for azimuth detection, and a plurality of gyro sensors is used to increase the accuracy of angular velocity detection (Patent Document 1).

CITATION LIST

Patent Document

Patent Document 1: U.S. Pat. No. 9,217,639

SUMMARY OF THE INVENTION

Problems to be Solved by the Invention

In the technology described in Patent Document 1, a rotatable table for rotating a plurality of gyro sensors is provided. However, in order to perform azimuth detection in a wearable device such as a timepiece, it is necessary to reduce the size of a mechanism for azimuth detection, and thus the related art has an unsolved problem in this respect.

The present technology has been made in light of such a point, and provides a timepiece, an azimuth detection method, and a program capable of performing azimuth detection with a small mechanism by using a pointer included in the timepiece.

Solutions to Problems

In order to solve the above-described problems, a first technology is a timepiece including a pointer, an angular velocity sensor that is provided in the pointer and detects an angular velocity, and an azimuth detection processing unit that performs an azimuth detection process from a detection result of the angular velocity sensor.

Moreover, a second technology is an azimuth detection method for performing an azimuth detection process from a detection result of an angular velocity sensor in a timepiece including a pointer and an angular velocity sensor provided on the pointer and configured to detect an angular velocity.

Furthermore, a third technology is a program for causing a computer to execute an azimuth detection method for performing an azimuth detection process from a detection result of an angular velocity sensor in a timepiece including a pointer and an angular velocity sensor that is provided in the pointer and detects an angular velocity.

MODE FOR CARRYING OUT THE INVENTION

Hereinafter, embodiments of the present technology will be described with reference to the drawings. Note that the description will be given in the following order.

1. First Embodiment

[1-1. External Configuration of Timepiece 100]

[1-2. Block Configuration of Timepiece 100]

[1-3. Azimuth Detection Process in First Embodiment]

<2. Second Embodiment
[2-1. Azimuth Detection Process in Second Embodiment]
<3. Modification Examples>

1. First Embodiment

[1-1. External Configuration of Timepiece 100]

Figure 1:
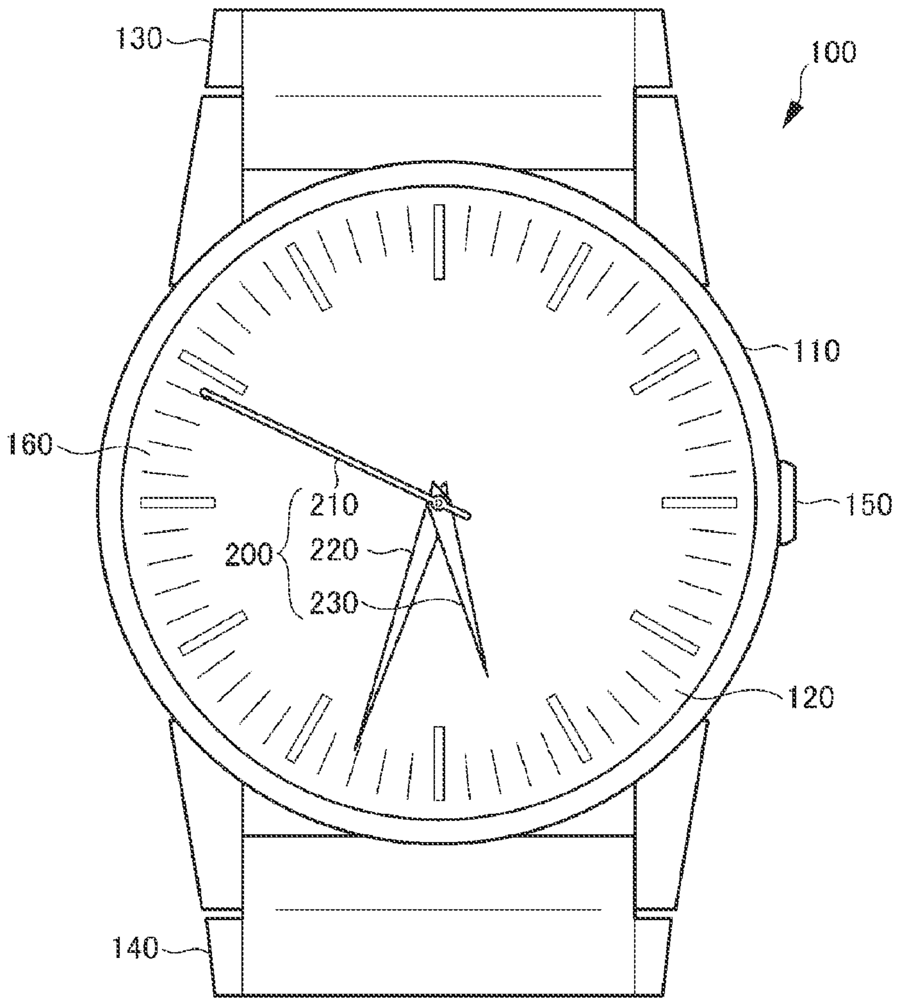
FIG. 1 is a view showing an external configuration of a timepiece 100.

One embodiment of a timepiece 100 according to the present technology will be described with reference to FIG. 1. The timepiece 100 is configured as a wristwatch. The timepiece 100 includes a case 110. The case 110 includes a hard synthetic resin, metal, or the like, and is formed in a substantially circular shape in front view. The case 110 is configured such that the front side is opened, and a glass plate 120 is attached to the opening. Moreover, a band attachment portion 130 and a band attachment portion 140 to which the timepiece 100 band is attached are provided on outer peripheral portions of the case 110 located on the 12 o'clock side and the 6 o'clock side, respectively.

A switch 150 which is a manipulation member is provided on a side face of the case 110. The switch 150 is a manipulation piece for selecting various functions such as mode switching and time adjustment of the timepiece 100 and for inputting an instruction. Note that the number of switches 150 is not limited to one, and a plurality of switches may be provided.

Furthermore, a timepiece module is provided inside the case 110. This timepiece module includes an index board 160 that indicates time, a pointer 200 that moves a needle on the index board 160, a driving unit 104 that drives the pointer 200, and a circuit board for controlling the entire wristwatch 100. The pointer 200 includes a second hand 210 indicating a measured second, a minute hand 220 indicating a measured minute, and an hour hand 230 indicating a measured hour.

The index board 160 includes, for example, a synthetic resin film and is formed in a substantially circular shape like the glass plate 120, and a mark, a character, or the like representing time is written on a peripheral edge portion thereof. Furthermore, the second hand 210, the minute hand 220, and the hour hand 230 are attached to a pointer shaft inserted into a through hole provided at the center of the index board 160, and the driving unit 104 rotates the pointer shaft so that the second hand 210, the minute hand 220, and the hour hand 230 rotate on the index board 160 to indicate time. Note that the case 110 and the indexing board 160 may have any shape such as a quadrangular shape or a triangular shape other than the circular shape.

Figure 2A:
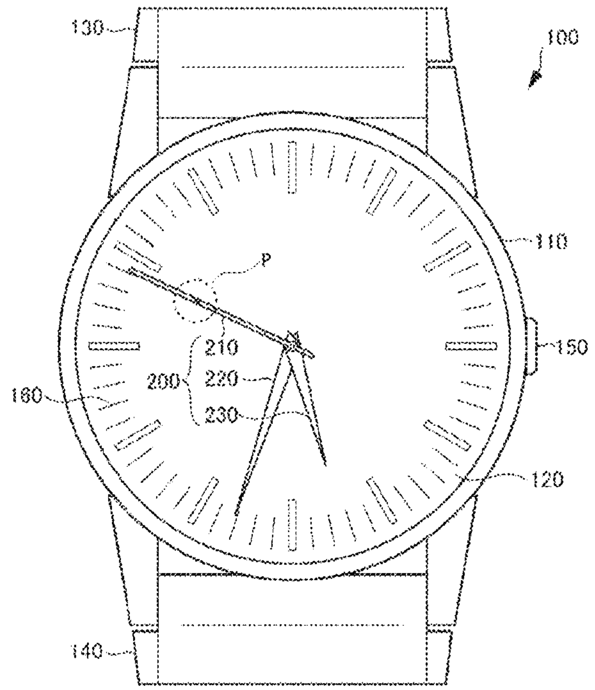
FIG. 2 is a partially enlarged view of the timepiece 100 showing a gyro sensor 300 provided on a second hand 210 of the timepiece 100.
Figure 2B:
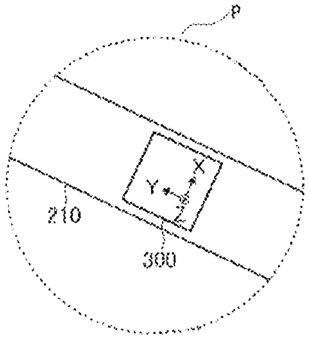
Figure 3A:
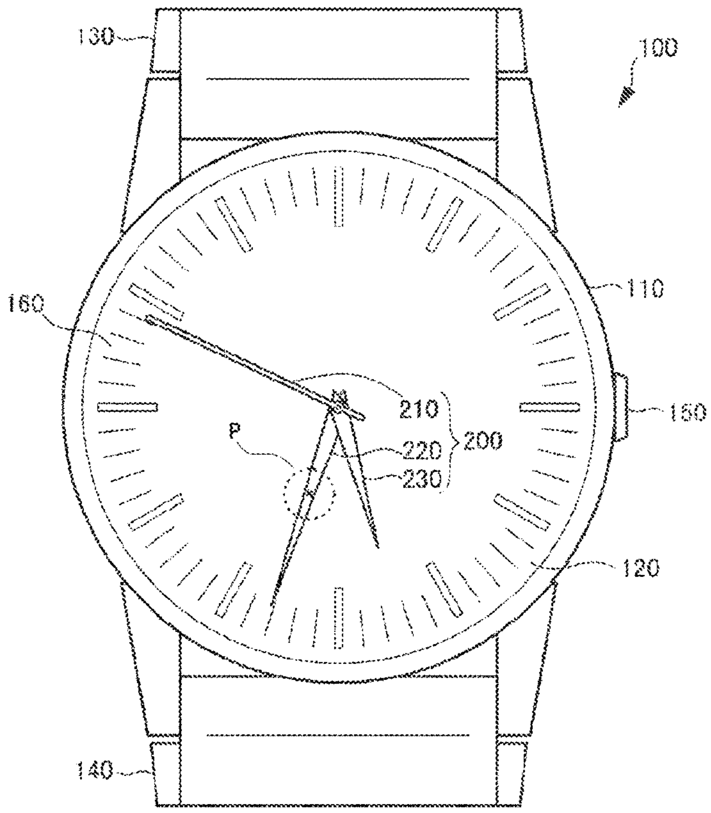
FIG. 3 is a partially enlarged view of the timepiece 100 showing the gyro sensor 300 provided on a minute hand 220 of the timepiece 100.
Figure 3B:
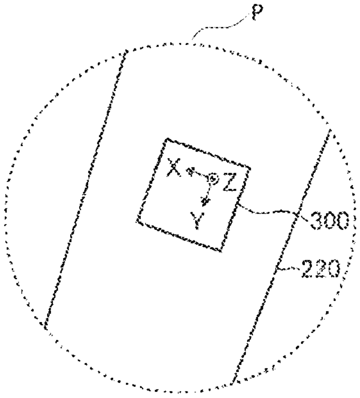
Figure 4A:
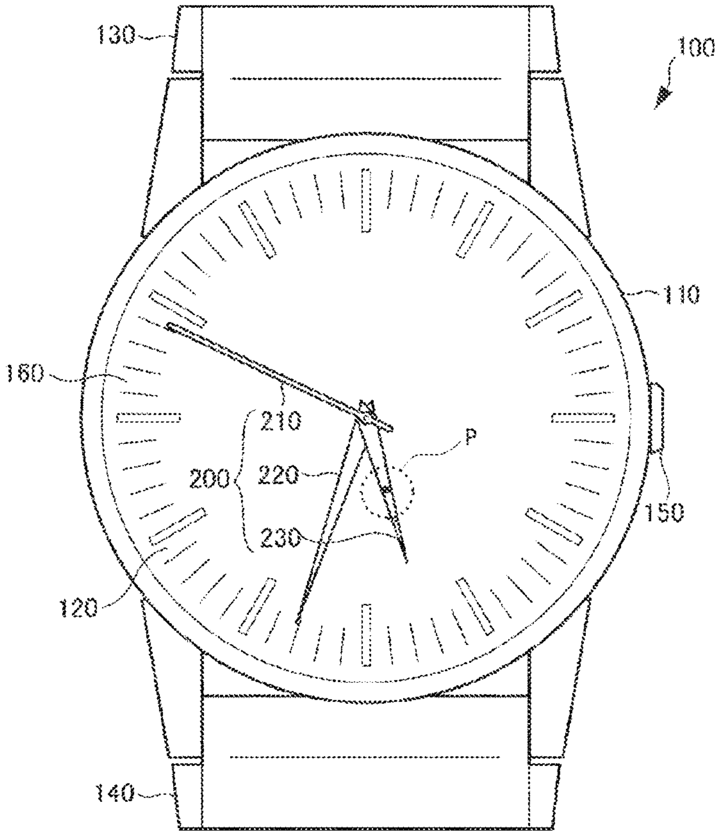
FIG. 4 is a partially enlarged view of the timepiece 100 showing the gyro sensor 300 provided on an hour hand 230 of the timepiece 100.
Figure 4B:
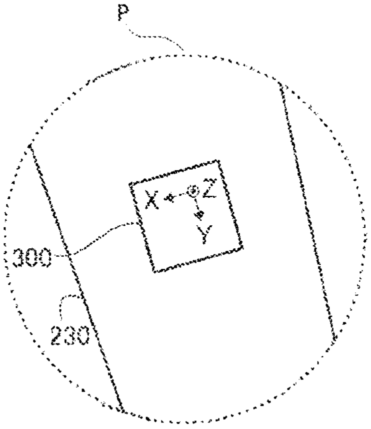

In the present technology, a gyro sensor 300 is provided on any one of the second hand 210, the minute hand 220, and the hour hand 230 as the pointer 200. The gyro sensor 300 is an angular velocity sensor in the claims. FIG. 2A and FIG. 2B shows an example in which the gyro sensor 300 is provided on the second hand 210. FIG. 3A and FIG. 3B shows an example in which the gyro sensor 300 is provided on the minute hand 220, and FIG. 4A and FIG. 4B shows an example in which the gyro sensor 300 is provided on the hour hand 230. In the present technology, the gyro sensor 300 may be provided on any one of the second hand 210, the minute hand 220 and the hour hand 230. The gyro sensor 300 is preferably provided on one hand from the viewpoint of simplifying the manufacturing process of the timepiece 100 and reducing the manufacturing cost.

In the present embodiment, as shown in FIG. 2A and FIG. 2B, it is assumed that one gyro sensor 300 is provided on the second hand 210.

Figure 5A:
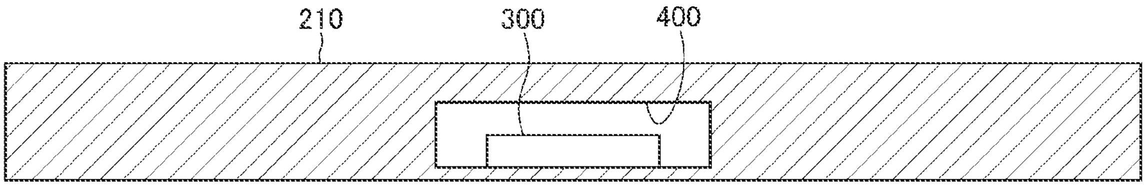
FIGS. 5A, 5B, and 5C are explanatory diagrams of a configuration in which the gyro sensor 300 is provided on a pointer 200.
Figure 5B:
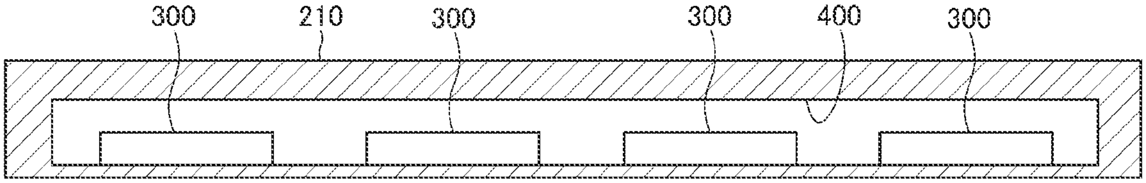
Figure 5C:
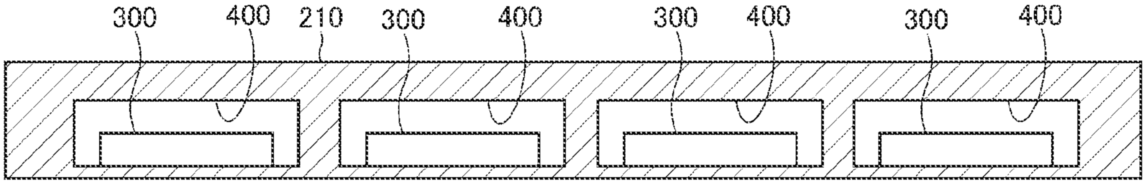

Note that, in a case where the gyro sensor 300 is provided on the pointer 200, the gyro sensor 300 is preferably provided in a vacuum space 400 in the pointer 200 as shown in FIG. 5A. In FIGS. 5A, 5B, and 5C, as an example, the gyro sensor 300 is provided on the second hand 210. By providing the gyro sensor 300 in the vacuum space 400, the detection accuracy of the angular velocity can be enhanced. For example, it can be realized by forming the pointer 200 with silicon, glass, or the like, providing the sealed vacuum space 400 therein, and providing the gyro sensor 300 therein. Alternatively, a plurality of the gyro sensors 300 is provided in one pointer 200, the plurality of gyro sensors 300 may be provided in one vacuum space 400 as shown in FIG. 5B, or the vacuum space 400 may be provided for each gyro sensor 300 in the pointer 200 as shown in FIG. 5C. Moreover, the space, where the pointer 200 of the timepiece 100 is provided, may be evacuated, or the entire timepiece 100 including the pointer 200 provided with the gyro sensor 300 may be housed in the vacuum space. Furthermore, when the plurality of gyro sensors 300 is provided in the pointer 200, a vacuum space may be formed for each gyro sensor 300.

[1-2. Block Configuration of Timepiece 100]

Figure 6:
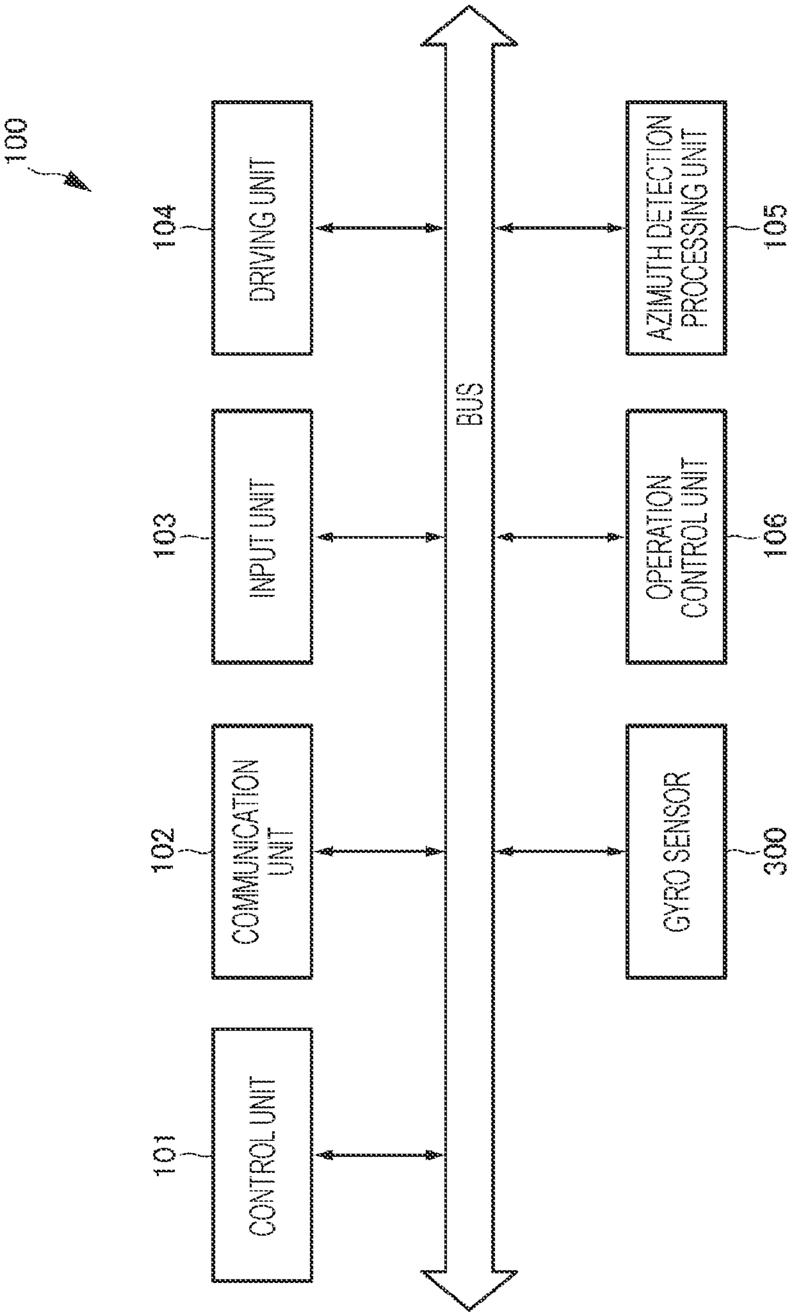
FIG. 6 is a block diagram showing the configuration of timepiece 100.

Next, the block configuration of the timepiece 100 will be described with reference to FIG. 6. The timepiece 100 includes at least a control unit 101, a communication unit 102, an input unit 103, a driving unit 104, an azimuth detection processing unit 105, an operation control unit 106 and a gyro sensor 300.

The control unit 101 is constituted by a central processing unit (CPU), a random access memory (RAM), a read only memory (ROM) and the like. The CPU controls the entire timepiece 100 and each unit by executing various processes in accordance with a program stored in the ROM to issue a command.

The communication unit 102 is a communication module for communicating with other devices and the Internet. Examples of the communication method for the Internet include wired communication, a wireless local area network (LAN), a wide area network (WAN), wireless fidelity (WiFi), and a fourth generation mobile communication system (4G). Examples of a method for communicating with another device include Bluetooth (registered trademark), ZigBee, near field communication (NFC), infrared communication, and the like. Note that the timepiece 100 does not have to include the communication unit 102.

The input unit 103 is used by a user to input an instruction to the timepiece 100. The switch 150 described in the external configuration of the timepiece 100 also corresponds to the input unit 103. In addition, the input unit 103 may be a touch panel, a microphone, and a voice input by voice recognition process. When the user inputs an input to the input unit 103, a control signal corresponding to the input is generated and supplied to the control unit 101. Then, the control unit 101 performs various processes corresponding to the control signal.

The driving unit 104 rotates the pointer 200 and includes a plurality of motors, a plurality of gears, and the like, and is configured to operate the pointer 200 normally included in a known timepiece.

The azimuth detection processing unit 105 detects an azimuth by using the angular velocity supplied from the gyro sensor 300. The details of the azimuth detection will be described later.

The operation control unit 106 controls the driving unit 104 for azimuth detection and azimuth detection result output. The operation control unit 106 generates a driving signal for driving the driving unit 104 and controls the driving unit 104 to perform predetermined operation by the generated driving signal. The operation control unit 106 may be configured by a motor driver integrated circuit (IC) or may be configured by a processing unit such as the central processing unit (CPU) executing a program.

The operation control unit 106 holds, as a setting, the state of the pointer 200 for detecting the angular velocity by the gyro sensor 300. On the basis of this setting, the operation control unit 106 controls the driving unit 104 to operate the pointer 200. In a case where it is necessary to stop the pointer 200 in a predetermined state in order to detect the angular velocity, the stop state may be set by a state (e.g., a state indicating 0 seconds, a state indicating 10 seconds, a state indicating 30 seconds, and the like) of the second hand 210 indicating a specific time. Moreover, the rotation angle of the second hand 210 from the reference state (e.g., the state in which the second hand 210 points to 0 o'clock) may be set. Furthermore, it may be set by an elapsed time (e.g., a state after 10 seconds from the reference state, and the like) from the reference state. This setting may be set by default in the timepiece 100 or may be set by a user's input to the input unit 103.

The gyro sensor 300 is an angular velocity sensor for three axis directions (x, y, z), and detects an angular velocity used for azimuth detection. The gyro sensor 300 supplies the detected angular velocity to the azimuth detection processing unit 105. As described above, in the present embodiment, the gyro sensor 300 is provided on the second hand 210.

The timepiece 100 is configured as described above. Note that, although not essential, the timepiece 100 may include a display including, for example, a liquid crystal display (LCD), a plasma display panel (PDP), an organic electro luminescence (EL) panel, or the like. The azimuth detection processing unit 105 and the operation control unit 106 may be configured by hardware or may be configured by an integrated circuit or the like executing a program.

[1-3. Azimuth Detection Process in First Embodiment]

Figure 7:
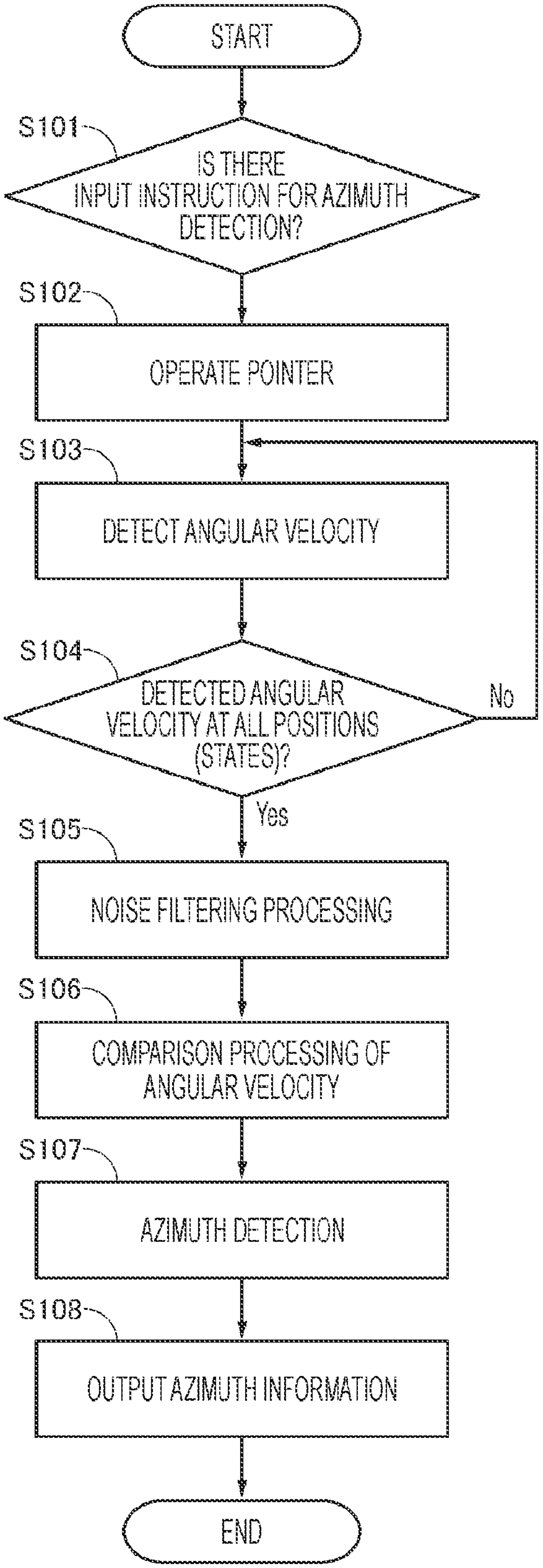
FIG. 7 is a flowchart showing an azimuth detection process according to a first embodiment.

Next, the azimuth detection process according to the first embodiment will be described with reference to a flowchart of FIG. 7.

First, in Step S101, when an input instructing azimuth detection is received from the user, the processing proceeds to Step S102 (Yes in Step S101).

Next, in Step S102, the operation control unit 106 controls the driving unit 104 to operate the second hand 210 provided with the gyro sensor 300. In the first embodiment, the operation of the second hand 210 is operation indicating a time as a normal timepiece.

Figure 8C:
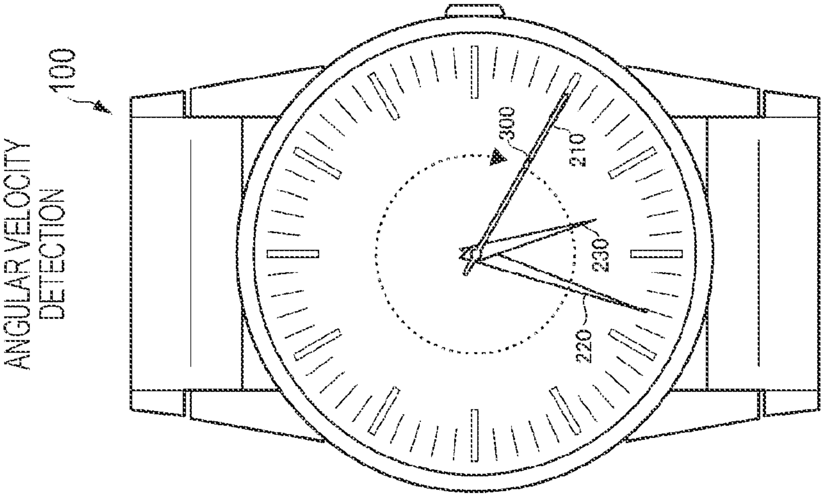
FIGS. 8A, 8B, and 8C are views showing the operation of the timepiece 100 in the first embodiment.
Figure 8B:
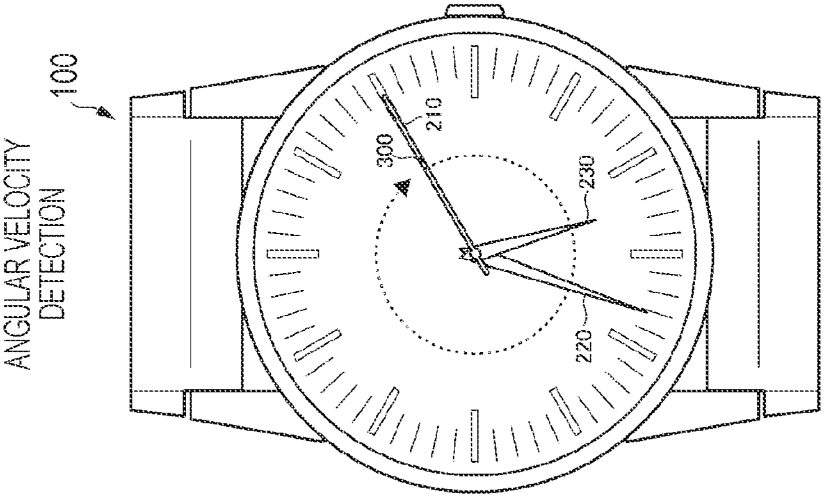
Figure 8A:
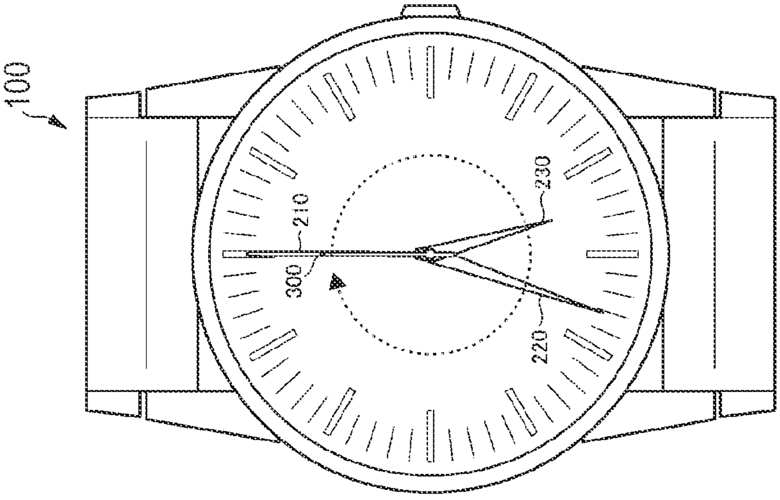

Next, in Step S103, an angular velocity is detected by the gyro sensor 300 provided on the second hand 210. In the first embodiment, as shown in FIGS. 8A, 8B, and 8C, the second hand 210 provided with the gyro sensor 300 continues the operation of measuring and indicating the time as the original timepiece 100, and the position of the gyro sensor 300 is changed by the operation so that the angular velocity is detected at a plurality of positions (states of different second hands 210) of a preset number. In the example of FIGS. 8A, 8B, and 8C, while the second hand 210 continues the operation indicating the time as the timepiece 100, the gyro sensor 300 detects the angular velocity in a state of 10 seconds as shown in FIG. 8B, and the gyro sensor 300 detects the angular velocity in a state of 20 seconds. During this period, the operation of the second hand 210 does not stop. Note that 10 seconds and 20 seconds are merely examples, and detection of the angular velocity is not limited to that state.

Next, in Step S104, it is determined whether or not an angular velocity has been detected by the gyro sensor 300 at a plurality of positions (states of different second hands 210) of a preset number. In this determination, the azimuth detection processing unit 105 sets the number of angular velocities to be used for azimuth detection in advance, and the determination can be made based on whether or not the angular velocity acquired from the gyro sensor 300 has reached the number. In the present technology, the gyro sensor 300 may detect angular velocity at least at two different positions (states of two different second hands 210). Therefore, the number of angular velocities to be detected is set in advance in the operation control unit 106, and when the number of angular velocities is detected, the processing proceeds from Step S104 to Step S105 (Yes in Step S104).

Next, in Step S105, predetermined noise filtering processing is performed on all angular velocities.

Next, in Step S106, comparison processing of all angular velocities is performed. Then, in Step S107, a specific azimuth (north in the present embodiment) is detected by comparison processing of all angular velocities. The details of the detection of the azimuth by the comparison processing will be described later.

Figure 9:
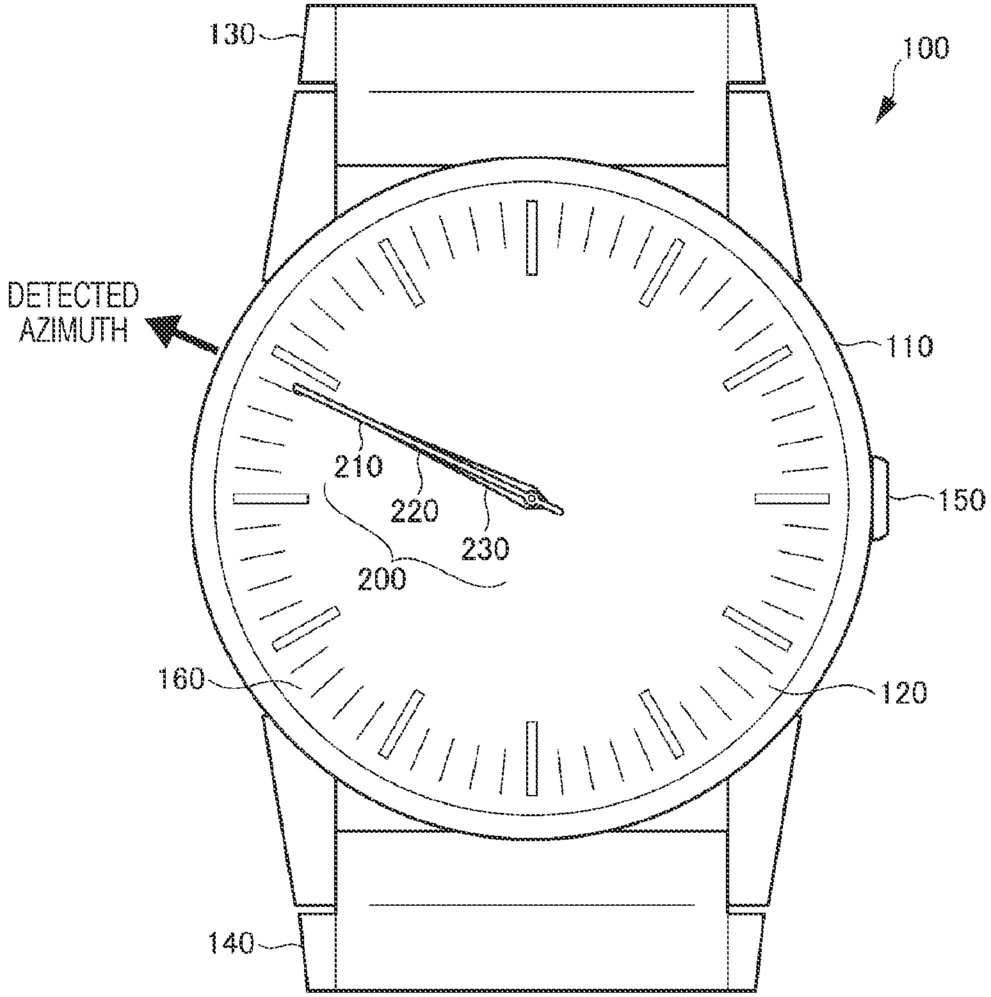
FIG. 9 is a diagram showing a method of presenting an azimuth.

Next, in Step S108, information on the azimuth detected by the operation of the pointer 200 by the operation control unit 106 is shown to the user. As shown in FIG. 9, the azimuth information is presented by the pointer 200 by causing all of the second hand 210, the minute hand 220 and the hour hand 230, which are the pointer 200, to point in the azimuth of the detected direction. As a result, the user can visually obtain the azimuth information. Note that the azimuth information is not necessarily presented by all of the second hand 210, the minute hand 220 and the hour hand 230, and may be presented by any one of the second hand 210, the minute hand 220, and the hour hand 230 or may be presented by a combination of any two of them.

Figure 10A:
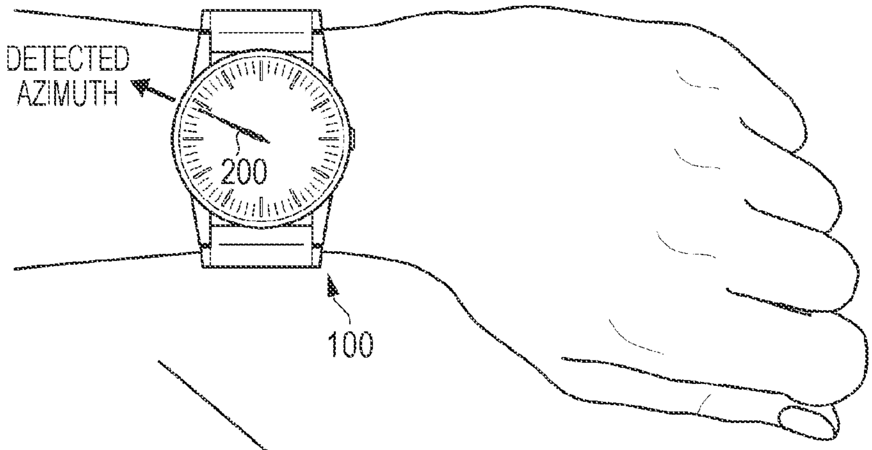
FIGS. 10A, 10B, and 10C are diagrams showing a method of presenting an azimuth.
Figure 10B:
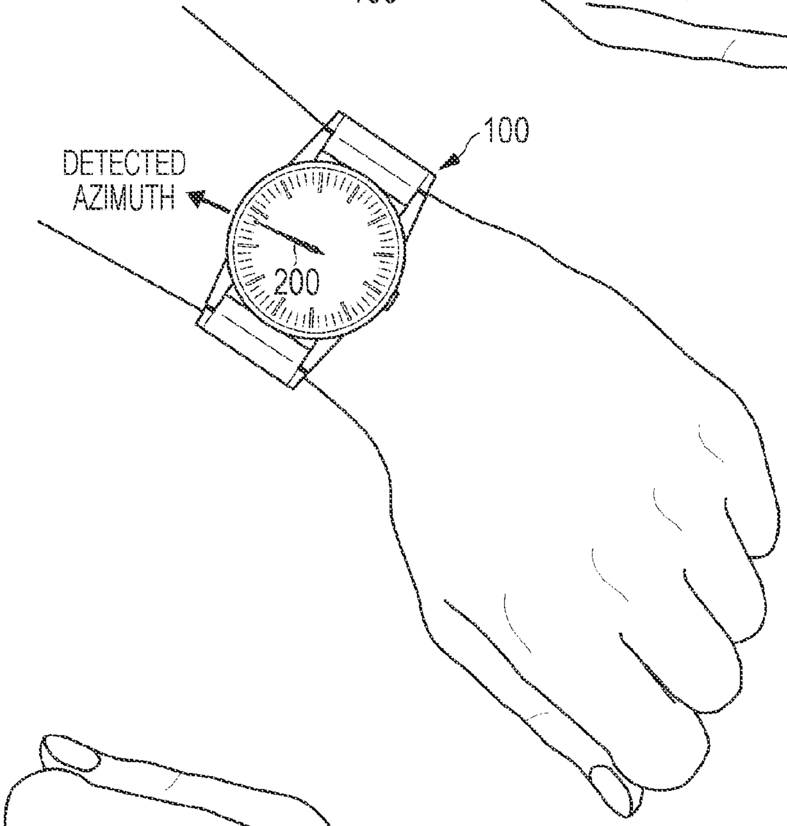
Figure 10C:
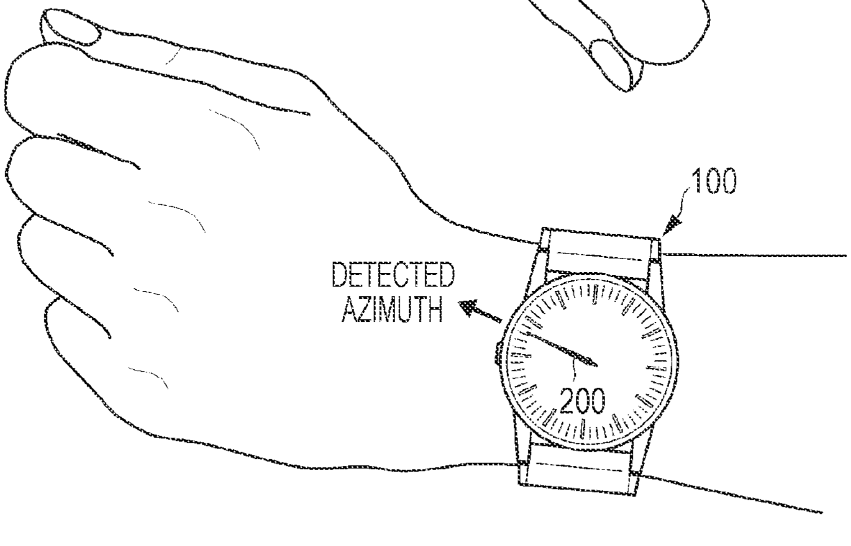

In addition, after the azimuth detected in Step S108 is presented to the user by the pointer 200, the pointer 200 may not be returned to the operation of indicating time as the normal timepiece 100, and the operation control unit 106 may perform control such that the pointer 200 continues to indicate the azimuth at all times in response to the movement of the user as shown in FIGS. 10A, 10B, and 10C.

In this case, the operation control unit 106 performs control to keep presenting the azimuth until the user instructs the end of the azimuth detection mode by the input to the input unit 103. When the user instructs the end of the azimuth detection mode by an input to the input unit 103, the pointer 200 returns to the operation of the normal timepiece 100. In addition, after the azimuth information is presented to the user by the operation of the pointer 200, the pointer 200 may be returned to the operation of the normal timepiece 100 after a predetermined time has elapsed.

Herein, a process of detecting a specific azimuth (north in the present embodiment) in the present technology will be described.

First, the angular velocity will be described. The angular velocity $\omega e$ of the rotation of the earth can be calculated by Expression 1 using 24 hours, which is the time during which the rotation of the earth makes one rotation. Note that dps is an abbreviation of degree per sec.

$$\omega e = 360(\text{deg})/24(\text{h})/3600(\text{sec}) = 0.0042(\text{dps}) \quad \text{[Expression 1]}$$

Herein, an angular velocity at 35 degrees north latitude in Tokyo is considered as an example. Suppose that the north latitude of 35 degrees is P and the angular velocity is Ω, the angular velocity Op of the rotation of the earth at the north latitude of 35 degrees can be calculated as in Expressions 2 and 3.

$$\Omega_P=\omega e\cdot\cos(\theta_P)=0.0042(\text{dps})\cdot\cos 35°=0.0034(\text{dps}) \quad \text{[Expression 2]}$$

$$\Omega_P=-1\cdot\omega e\cdot\cos(\theta_P)=0.0042(\text{dps})\cdot\cos 35°=-0.0034(\text{dps}) \quad \text{[Expression 3]}$$

$$\Omega_P=\omega e\cdot\sin(\theta_P)=0.0042(\text{dps})\cdot\sin 35°=0.0024(\text{dps}) \quad \text{[Expression 4]}$$

As described above, the gyro sensor 300 is the gyro sensor 300 in three axis directions (x, y, z), and detects the angular velocity in each axis. In a case where the three axis gyro sensor 300 is placed horizontally, the angular velocities of the x axis and the y axis are 0 in the east-west direction and the maximum value of +/− in the north-south direction. The angular velocity is constant in the z axis.

When the posture of the gyro sensor 300 is changed by, for example, 45 degrees at a substantially constant speed and rotated by 360 degrees, a sin wave is drawn on the x axis and the y axis among the three axes of the gyro sensor 300.

Figure 11:
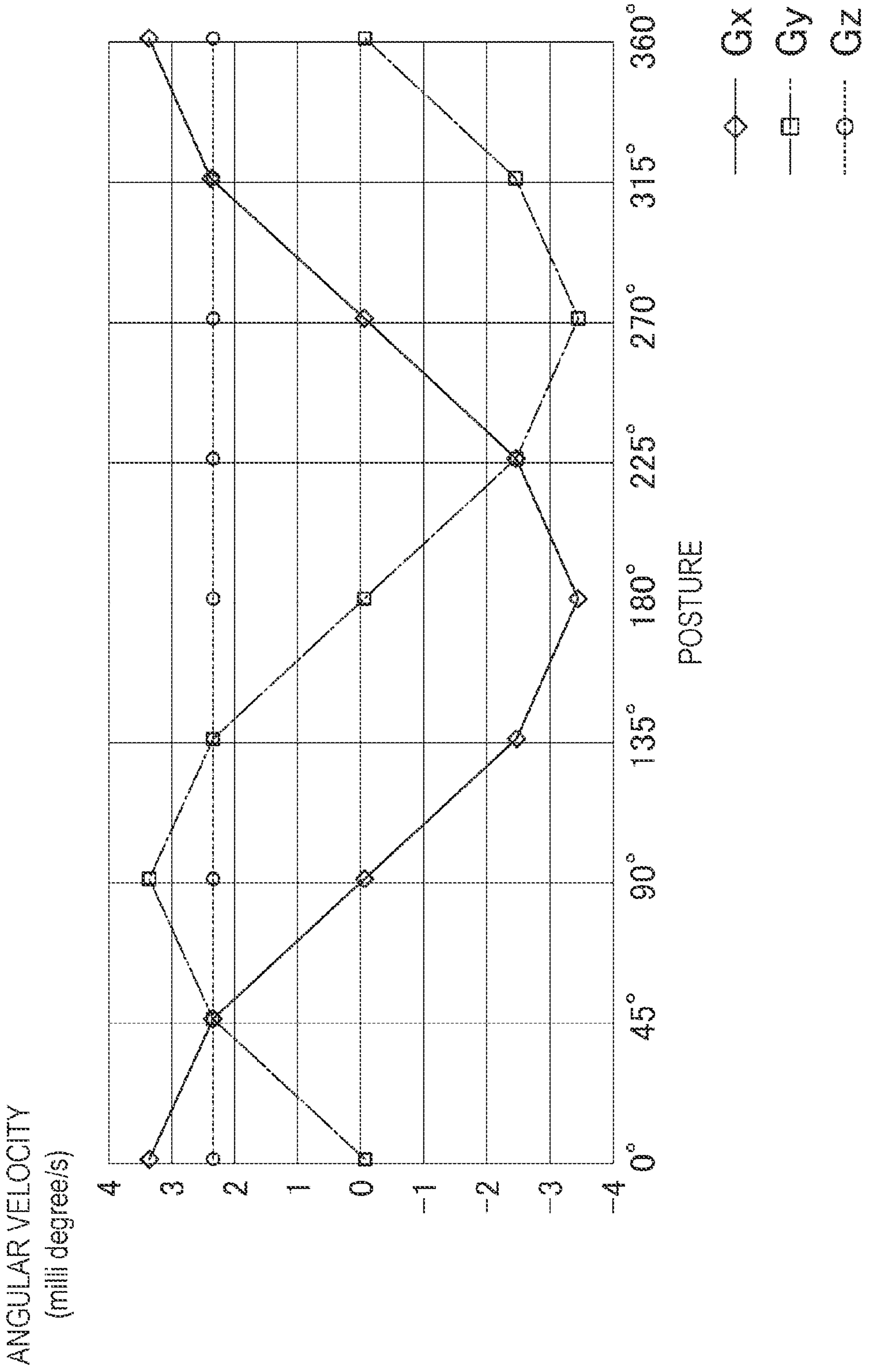
FIG. 11 is a graph showing actual measurement values acquired by the gyro sensor 300.

The theoretical values of the detection results of the respective three axes by the gyro sensor 300 thus obtained are as shown in FIG. 11. In the graph of FIG. 11, the vertical axis represents an angular velocity (dps), the horizontal axis represents an angle indicating the posture of the gyro sensor 300, Gx represents a detection value on the x-axis of the gyro sensor 300, Gy represents a detection value on the y-axis of the gyro sensor 300, and Gz represents a detection value on the z-axis of the gyro sensor 300. Then, as shown in FIG. 11, the detection value of the angular velocity corresponds to the azimuths of east, west, north and south. Theoretical values represent absolute values.

Then, the detection result is compared with the theoretical value, and the direction having the angular velocity closest to the north direction in the theoretical value can be detected as the north direction.

As described above, the azimuth can be detected from the angular velocity detected by the gyro sensor 300.

As described above, the azimuth detection is performed according to the first embodiment of the present technology. According to the first embodiment, since it is not necessary to cause the pointer 200 to perform special operation in order to detect the angular velocity by the gyro sensor 300, extra power is not consumed to change the state of the gyro sensor 300. Therefore, the azimuth can be efficiently detected.

2. Second Embodiment

[2-1. Azimuth Detection Process in Second Embodiment]

Figure 12:
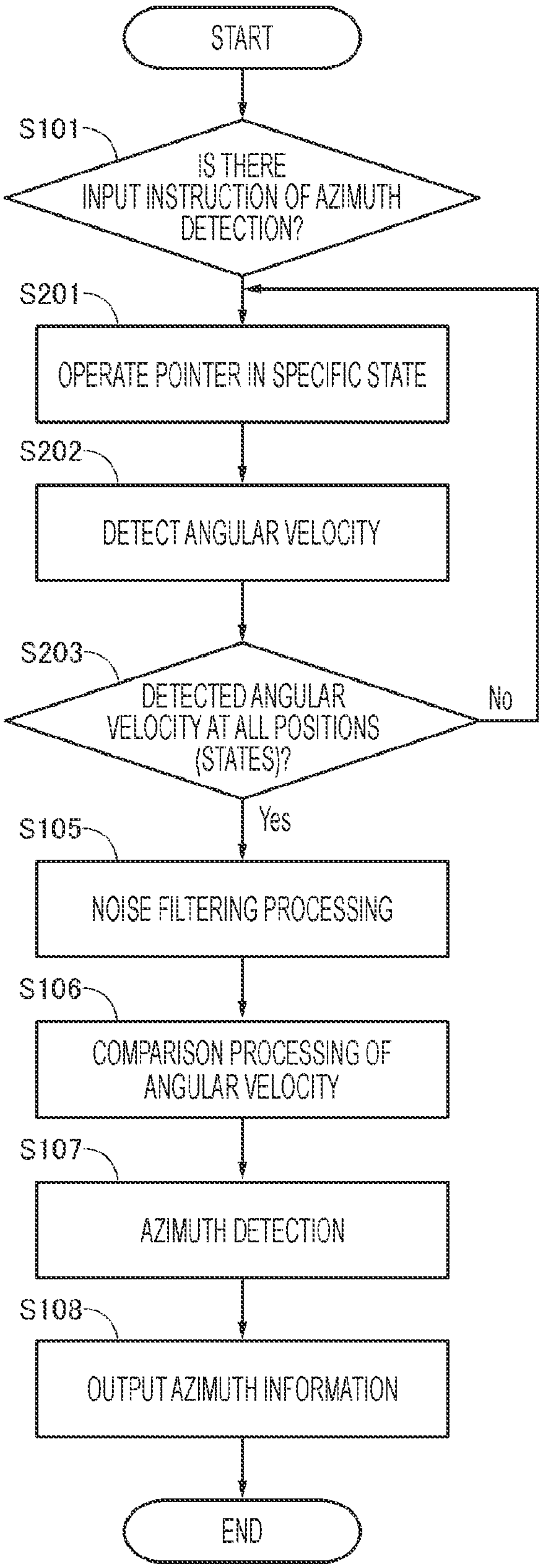
FIG. 12 is a flowchart showing azimuth detection process in a second embodiment.

Next, an azimuth detection process according to a second embodiment of the present technology will be described. Note that, in the flowchart of FIG. 12, Steps S105 to S108 are similar to those of the first embodiment, and thus description thereof is omitted.

First, when an input instructing azimuth detection from the user is received in Step S101, the processing proceeds to Step S201 (Yes in Step S101).

Figure 13A:
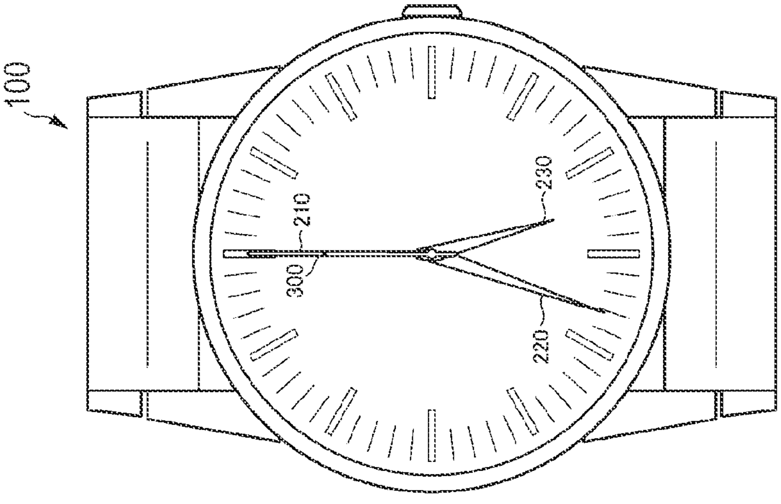
FIGS. 13A, 13B, and 13C are views showing operation of a timepiece 100 in the second embodiment.
Figure 13B:
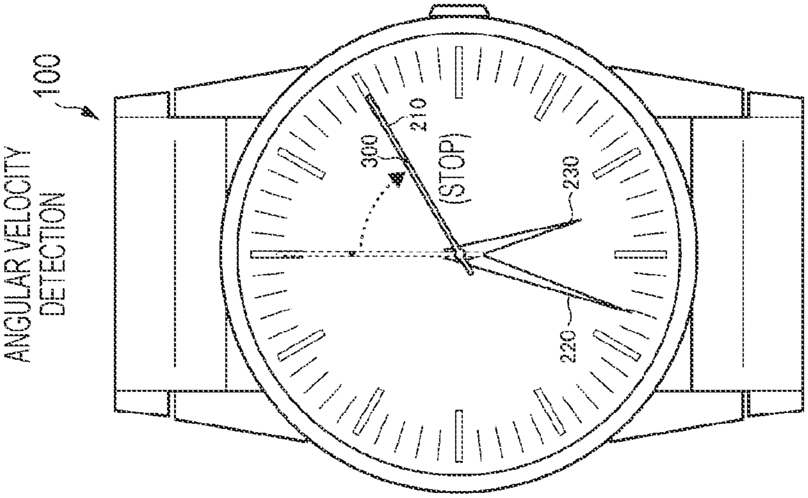
Figure 13C:
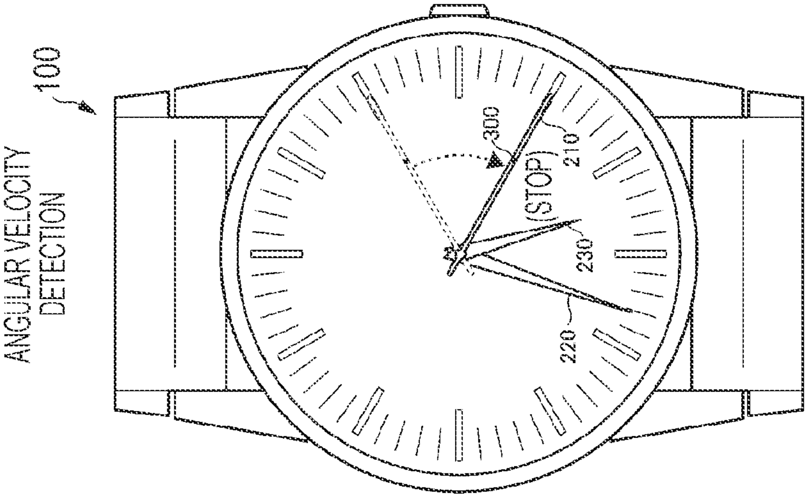

Next, in Step S201, an operation control unit 106 controls a driving unit 104 to operate the second hand 210. Next, in Step S202, an angular velocity is detected by a gyro sensor 300 provided on the second hand 210. In the second embodiment, as shown in FIGS. 13A, 13B, and 13C, the operation of the pointer 200 provided with the gyro sensor 300 is temporarily stopped. Then, a second hand 210 provided with the gyro sensor 300 is rotated to a specific state, and the operation of the second hand 210 is stopped in the specific state. In the example of FIGS. 13A, 13B, and 13C, as shown in FIG. 13B, the second hand 210 is stopped in the state of 10 seconds, and the angular velocity is detected by the gyro sensor 300. Thereafter, as shown in FIG. 13C, the second hand 210 is further stopped in the state of 20 seconds, and the angular velocity is detected by the gyro sensor 300. Note that the rotation speed at which the second hand 210 is rotated to a specific state does not have to be the same as the speed in the case of indicating time. It is possible to quickly detect an azimuth by rotating faster.

Next, in Step S203, it is determined whether or not an angular velocity has been detected by the gyro sensor 300 at a plurality of positions (states of different second hands 210) of a preset number. In the present technology, the gyro sensor 300 may detect angular velocity at least at two different positions (states of two different second hands 210). The number of angular velocities to be detected is set in advance, and in a case where the number of angular velocities is detected, the processing proceeds from Step S203 to Step S105 (Yes in Step S203). Steps S201 to S203 are repeated until the angular velocity is detected at all the plurality of preset positions (different states of the second hands 210).

Therefore, in the second embodiment, the operation of the pointer 200 provided with the gyro sensor 300 is temporarily stopped as the timepiece 100, the second hand 210 provided with the gyro sensor 300 is rotated to a first specific state, the operation of the second hand 210 is stopped in the first specific state, and the angular velocity is detected by the gyro sensor 300. Then, the second hand 210 is operated again to rotate the second hand 210 to a second specific state, and in the second specific state, the second hand 210 is stopped and the angular velocity is detected by the gyro sensor 300. In this case, the operation of rotating the second hand 210 to a specific position does not have to be the same operation as the operation indicating time.

Then, in Steps S105 to S108, the azimuth is detected and the azimuth information is outputted as in the first embodiment.

The number of places where the second hand 210 is stopped and the angular velocity is detected by the gyro sensor 300 is not limited to two, and may be three or more or may be any number of places. When the number of times of detection is increased, the number of angular velocities to be detected is increased, and the angular velocities can be synthesized to perform azimuth detection with higher accuracy.

The present technology is configured as described above. According to the present technology, it is possible to detect an azimuth by the gyro sensor 300 using the structure of the existing timepiece 100. Since the angular velocity is detected by the gyro sensor 300 at different positions using the pointer 200 operating in the timepiece 100, it is not necessary to newly provide a mechanical structure for changing the position of the gyro sensor 300. Therefore, the azimuth can be detected without complicating the structure of the timepiece 100. In addition, since the gyro sensor 300 is provided on the pointer 200 operating in the timepiece 100, the user herself/himself wearing the timepiece 100 does not have to move to change the position of the gyro sensor 300 so that the azimuth can be easily detected.

In addition, even a gyro sensor that is inexpensive and does not necessarily have high accuracy as a single sensor can perform highly accurate azimuth detection by using a plurality of detected angular velocities.

Furthermore, by applying the present technology to a timepiece worn by a user on a daily basis, the user can easily detect an azimuth.

Moreover, since it is not necessary to use a geomagnetic sensor or a GPS for the azimuth detection, it is possible to perform the azimuth detection even in a situation or a place where problems such as malfunction of the geomagnetic sensor or the GPS, malfunction, and deterioration in accuracy occur. In addition, the use of the small gyro sensor 300 rather than the use of the large gyro sensor 300 with high accuracy facilitates mounting on a small device such as the timepiece 100. Even when the small and inexpensive gyro sensor 300 having lower accuracy than the large gyro sensor 300 is used, the accuracy of the azimuth detection can be enhanced by combining the angular velocities of the plurality of gyro sensors 300.

The present technology is also useful for azimuth detection on other planets other than the Earth, such as, for example, Mars. For example, the magnetic field characteristics of a planet are different for each planet, and a geomagnetic sensor using the geomagnetism of the earth cannot always be used without any problem for other planets. Therefore, in other planets other than the Earth, there is a possibility that the geomagnetic sensor cannot be used for azimuth detection. On the other hand, since the present technology performs azimuth detection using the gyro sensor 300 as an angular velocity sensor, the present technology can be used for azimuth detection in planets other than the Earth.

2. Modification Examples

Although the embodiments of the present technology have been specifically described above, the present technology is not limited to the above-described embodiments, and various modifications based on the technical idea of the present disclosure can be made.

Figure 14B:
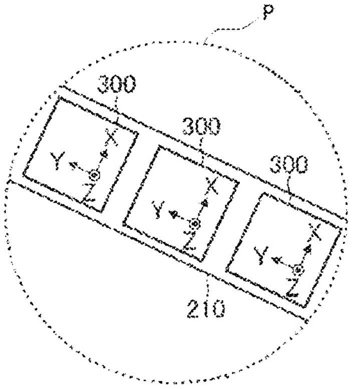
FIG. 14B is a partially enlarged view of the timepiece 100 showing the plurality of gyro sensors 300 provided on the pointer 200 of the timepiece 100.
Figure 14A:
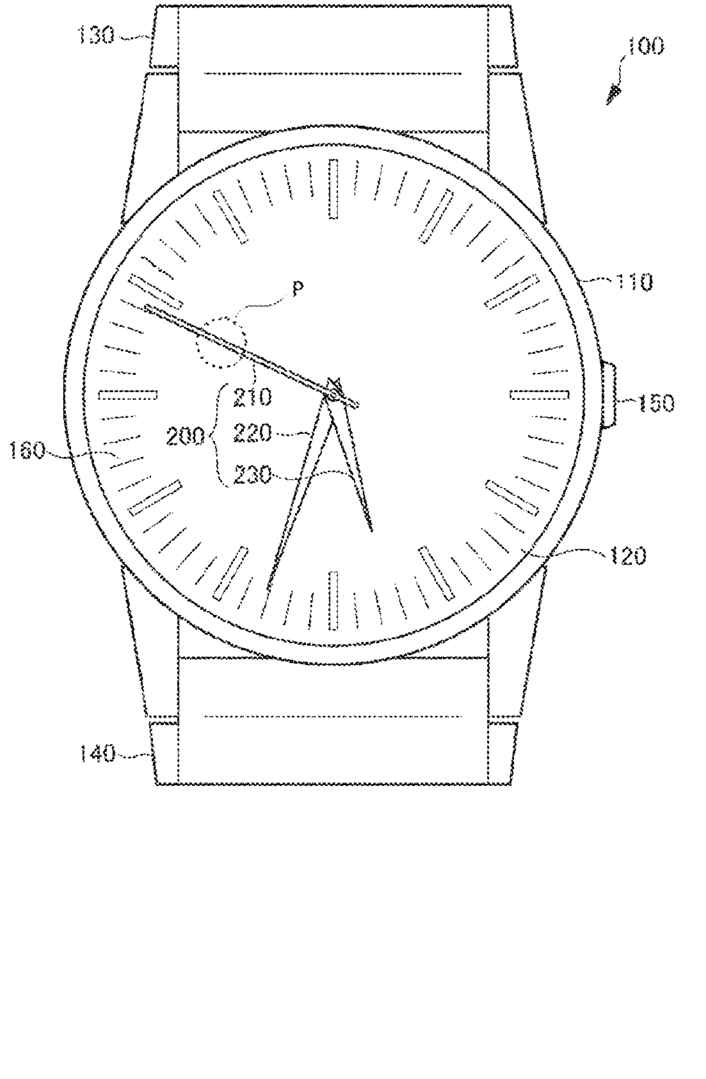
FIG. 14A is a view showing a configuration in which a plurality of gyro sensors 300 is provided on a pointer 200 of a timepiece 100.

The number of gyro sensors 300 provided on the pointer 200 of the timepiece 100 is not limited to one. As shown in FIG. 14A and FIG. 14B, a plurality of gyro sensors 300 may be provided on one pointer 200 (a second hand 210 in FIG. 14B). The accuracy of the azimuth detection can be enhanced by detecting a plurality of angular velocities by the plurality of gyro sensors 300.

As shown in FIG. 14B, by providing the plurality of gyro sensors 300 so that the x axis, the y axis, and the z axis coincide with each other, the angular velocity detected by each gyro sensor 300 can be synthesized as the angular velocity detected by one virtual gyro sensor. The azimuth can be detected using the angular velocity detected by the one virtual gyro sensor as in the above-described processing.

Figure 15B:
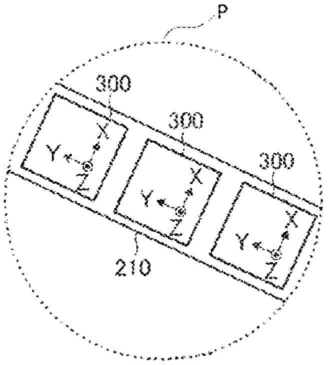
FIG. 15B and FIG. 15C are partially enlarged views of the timepiece 100 showing the plurality of gyro sensors 300 provided on a pointer 200 of the timepiece 100.
Figure 15C:
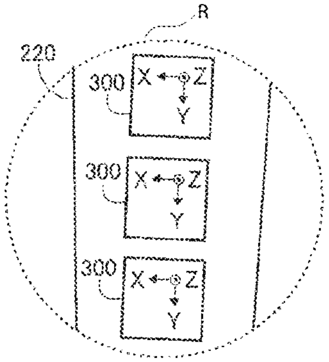
Figure 15A:
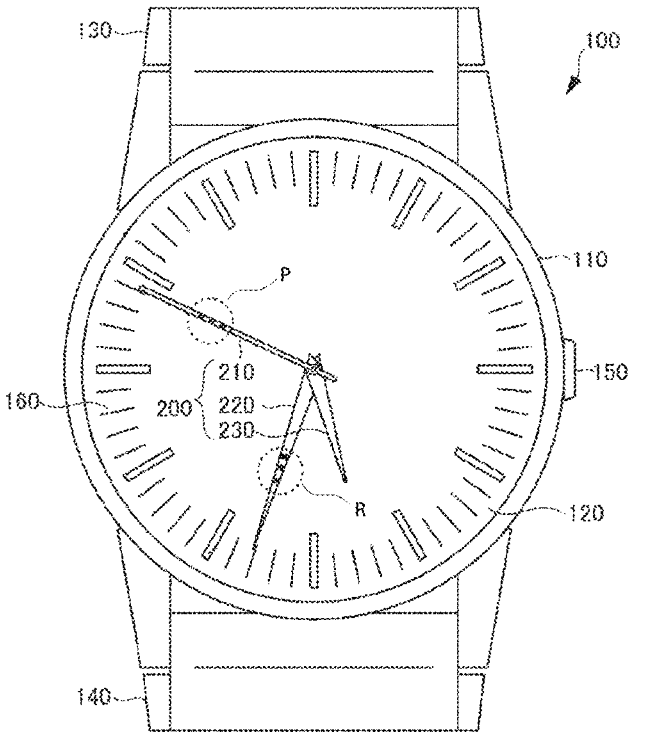
FIG. 15A is a view showing a configuration in which the plurality of gyro sensors 300 is provided on a plurality of pointers 200 of the timepiece 100.

In addition, the gyro sensor 300 may be provided on a plurality of pointers instead of one pointer. The gyro sensor 300 may be provided with the gyro sensor 300 on two hands among the three hands, such as a second hand 210 and a minute hand 220, the minute hand 220 and an hour hand 230, and the second hand 210 and the hour hand 230. In the example of FIG. 15A, FIG. 15B, and FIG. 15C, the gyro sensor 300 is provided on the second hand 210 and the minute hand 220. Alternatively, the gyro sensor 300 may be provided on all of the second hand 210, the minute hand 220 and the hour hand 230. In a case where the gyro sensor 300 is provided on the plurality of hands in this manner, the accuracy of the detection of the azimuth can be further enhanced by synthesizing the angular velocities detected by the plurality of gyro sensors 300. In a case where the gyro sensor 300 is provided on the two or more pointers 200, angular velocities can be simultaneously detected at different positions by simultaneously detecting angular velocities by the plurality of gyro sensors 300, and thus it is not necessary to operate the pointer 200 only for angular velocity detection.

Note that, in a case where the plurality of gyro sensors 300 is provided on the pointer 200 in a state where the axes do not coincide with each other, the x axis, the y axis, and the z axis of all the gyro sensors 300 may coincide with each other by a direct cosine matrix (DCM) or the like, and angular velocity may be synthesized as one virtual gyro sensor. The DCM is a matrix used to rotate the axis, and when the rotation angle of the axis is R, three axes of the x axis, the y axis and the z axis of the gyro sensor 300 are as shown in below equation.

$$\begin{bmatrix} x \\ y \\ z \end{bmatrix} = \begin{bmatrix} \cos Ry\ \cos Rz & \cos Ry\ \sin Rz & -\sin Ry \\ \sin Rx\ \sin Ry\ \cos Rz - \cos Rx\ \sin Rz & \sin Rx\ \sin Ry\ \sin Rz + \cos Rx\ \cos Rz & \sin Rx\ \cos Rz \\ \cos Rx\ \sin Ry\ \cos Rz + \sin Rx\ \sin Rz & \cos Rx\ \sin Ry\ \sin Rz - \sin Rx\ \cos Rz & \cos Rx\ \cos Ry \end{bmatrix} \begin{bmatrix} X \\ Y \\ Z \end{bmatrix} = DCM(R) \begin{bmatrix} X \\ Y \\ Z \end{bmatrix}$$

In the embodiments, the pointer 200 is operated by the control of the operation control unit 106, and the angular velocity is detected by the gyro sensor 300. However, the pointer 200 may be manually operated by a user's input such as manipulation of the switch 150.

An angular velocity may be detected after an instruction to execute azimuth detection is received from the user, and azimuth detection may be performed on the basis of the angular velocity, or even if there is no instruction from the user, angular velocity detection and azimuth detection may be performed constantly, and the latest azimuth information may be presented to the user when there is an instruction to present an azimuth from the user.

Figure 16:
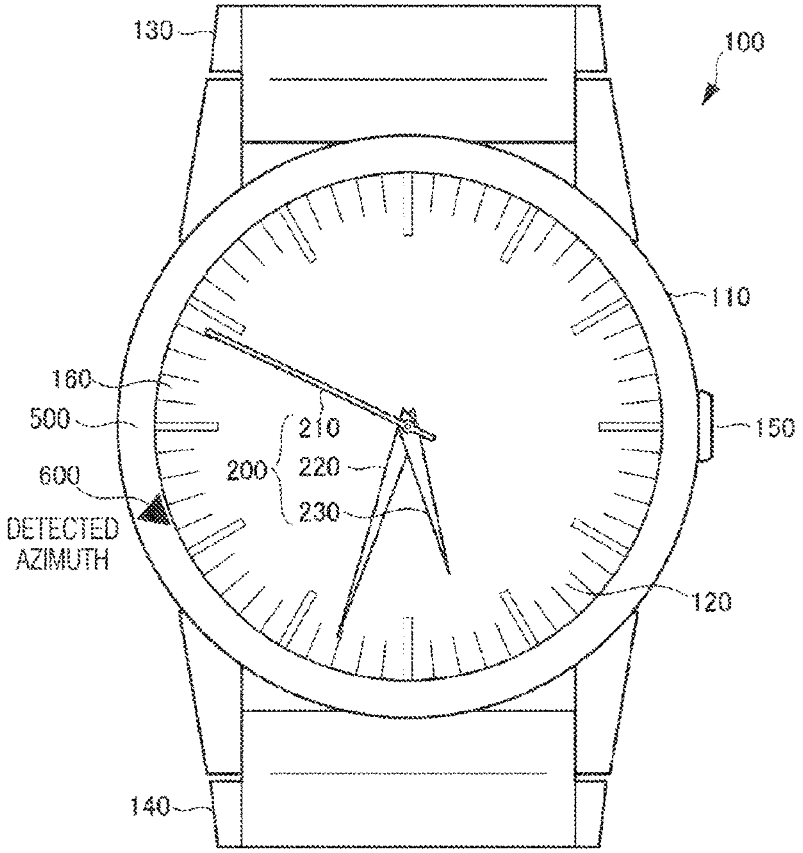
FIG. 16 is a diagram showing an example of presenting azimuth information by display on a display 500.

In the embodiments, the azimuth information is presented by the operation of the pointer 200 of the timepiece 100, but the presentation method is not limited thereto. As shown in FIG. 16, a display 500 may be provided on the timepiece 100, and an icon 600 indicating azimuth information may be displayed on the display 500. In the example of FIG. 16, the display is configured in a ring shape.

In addition, a mechanical structure indicating azimuth information by operation may be provided in the timepiece 100.

Figure 17:
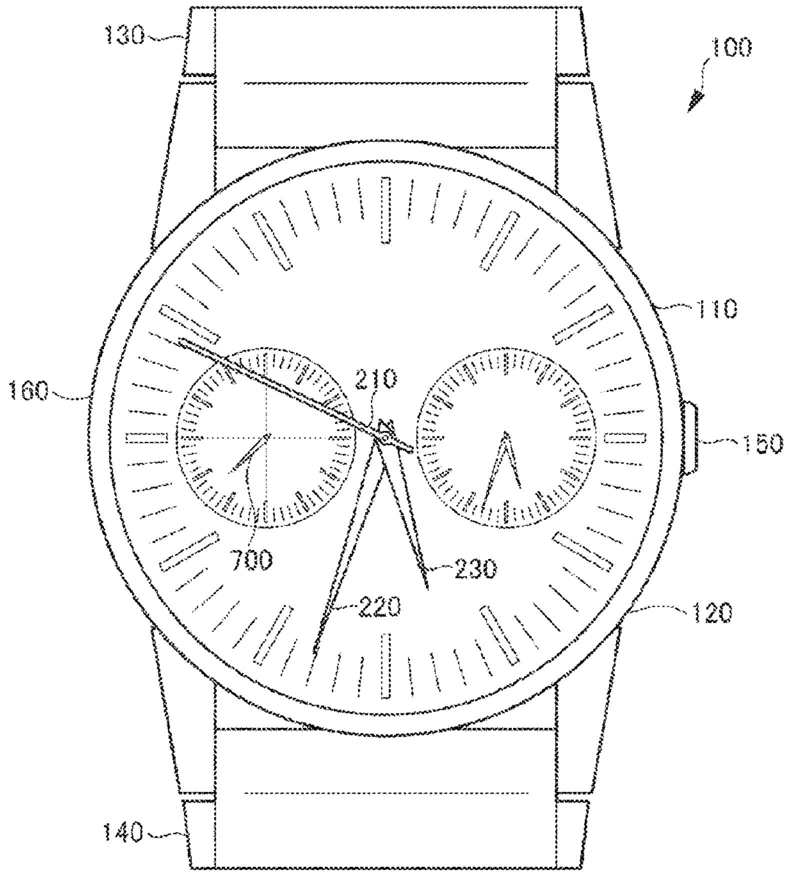
FIG. 17 is a view showing an example in which an azimuth detecting pointer is provided in the timepiece 100.

In the embodiments, the gyro sensor 300 is provided on the second hand 210, the minute hand 220, and the hour hand 230 included in the timepiece 100. However, as shown in FIG. 17, a pointer 700 for mounting the gyro sensor 300 different from the second hand 210, the minute hand 220, and the hour hand 230 may be provided in the timepiece 100.

Furthermore, in a case where the timepiece 100 includes pointers indicating, for example, date, temperature and the like in addition to the pointer 200 indicating time, the gyro sensor 300 may be provided in these pointers.

Although the description has been given assuming that the timepiece 100 is the wristwatch 100 in the embodiment, the timepiece 100 may be any timepiece having a moving pointer such as a stand clock or a wall clock.

The gyro sensor 300 is not limited to the three-axis gyro sensor 300, and may be a one-axis gyro sensor 300. Alternatively, an inertial measurement unit (IMU) may be used instead of the gyro sensor 300.

The present technology can be applied not only to azimuth information but also to information acquired by other sensors such as position information by the GPS or the like.

Note that the present technology can also adopt the following configurations.

(1)

A timepiece including:

a pointer;

an angular velocity sensor that is provided on the pointer and detects an angular velocity; and an azimuth detection processing unit that performs an azimuth detection process from a detection result of the angular velocity sensor.

(2)

The timepiece according to (1), in which the angular velocity sensor detects the angular velocity while the pointer is operating to indicate time.

(3)

The timepiece according to (1) or (2), further including an operation control unit that controls operation of the pointer.

(4)

The timepiece according to (3), in which the operation control unit operates the pointer to a specific state when the angular velocity sensor detects the angular velocity.

(5)

The timepiece according to (3) or (4), in which the operation control unit operates the pointer to indicate an azimuth detected by the azimuth detection processing unit.

(6)

The timepiece according to (5), in which the operation control unit operates the pointer to indicate the azimuth detected by the azimuth detection processing unit, and then returns the pointer to operation indicating time.

(7)

The timepiece according to any one of (3) to (6), in which the operation control unit operates the pointer to indicate an azimuth detected by the azimuth detection processing unit, and then maintains the pointer in a state of continuously indicating the azimuth.

(8)

The timepiece according to any one of (1) to (7), in which the azimuth detection processing unit performs the azimuth detection process by comparing the angular velocity detected by the angular velocity sensor with a theoretical value of the angular velocity corresponding to an azimuth.

(9)

The timepiece according to any one of (1) to (8), in which a plurality of the angular velocity sensors is provided on the pointer.

(10)

The timepiece according to any one of (1) to (9), in which the pointer is any one of a second hand, a minute hand or an hour hand, or a combination of any two hands or all three hands.

(11)

The timepiece according to (10), in which a plurality of the angular velocity sensors is provided on the pointer, and the plurality of the angular velocity sensors is provided on any one of the second hand, the minute hand or the hour hand.

(12)

An azimuth detection method including:

performing an azimuth detection process from a detection result of an angular velocity sensor in a timepiece including a pointer, and the angular velocity sensor that is provided on the pointer and detects an angular velocity.

(13)

A program causing a computer to execute an azimuth detection method including:

performing an azimuth detection process from a detection result of an angular velocity sensor in a timepiece including a pointer, and the angular velocity sensor that is provided on the pointer and detects an angular velocity.

REFERENCE SIGNS LIST

100 Timepiece
105 Azimuth detection processing unit
106 Operation control unit
200 Pointer
210 Second hand
220 Minute hand
230 Hour hand

The invention claimed is:

1. A timepiece, comprising:

a pointer;

an angular velocity sensor that is provided on the pointer and detects an angular velocity; and an azimuth detection processing unit that performs an azimuth detection process from a detection result of the angular velocity sensor.

2. The timepiece according to claim 1, wherein the angular velocity sensor detects the angular velocity while the pointer is operating to indicate time.

3. The timepiece according to claim 1, further comprising an operation control unit that controls operation of the pointer.

4. The timepiece according to claim 3, wherein the operation control unit operates the pointer to a specific state when the angular velocity sensor detects the angular velocity.

5. The timepiece according to claim 3, wherein the operation control unit operates the pointer to indicate an azimuth detected by the azimuth detection processing unit.

6. The timepiece according to claim 5, wherein the operation control unit operates the pointer to indicate the azimuth detected by the azimuth detection processing unit, and then returns the pointer to operation indicating time.

7. The timepiece according to claim 3, wherein the operation control unit operates the pointer to indicate an azimuth detected by the azimuth detection processing unit, and then maintains the pointer in a state of continuously indicating the azimuth.

8. The timepiece according to claim 1, wherein the azimuth detection processing unit performs the azimuth detection process by comparing the angular velocity detected by the angular velocity sensor with a theoretical value of the angular velocity corresponding to an azimuth.

9. The timepiece according to claim 1, wherein
a plurality of the angular velocity sensors is provided on the pointer.

10. The timepiece according to claim 1, wherein
the pointer is any one of a second hand, a minute hand or an hour hand, or a combination of any two hands or all three hands.

11. The timepiece according to claim 10, wherein
a plurality of the angular velocity sensors is provided on the pointer, and
the plurality of the angular velocity sensors is provided on any one of the second hand, the minute hand or the hour hand.

12. An azimuth detection method, comprising:
performing an azimuth detection process from a detection result of an angular velocity sensor in a timepiece including
a pointer, and
the angular velocity sensor that is provided on the pointer and detects an angular velocity.

13. A non-transitory computer-readable medium having stored thereon computer-executable instructions that, when executed by a processor of a computer, cause the processor to execute operations, the operations comprising:
performing an azimuth detection process from a detection result of an angular velocity sensor in a timepiece including
a pointer, and
the angular velocity sensor that is provided on the pointer and detects an angular velocity.

* * * * *